No. 693,974. Patented Feb. 25, 1902.
W. F. KOELLER & H. DYER.
LATHE TOOL.
(Application filed June 7, 1901.)
(No Model.)
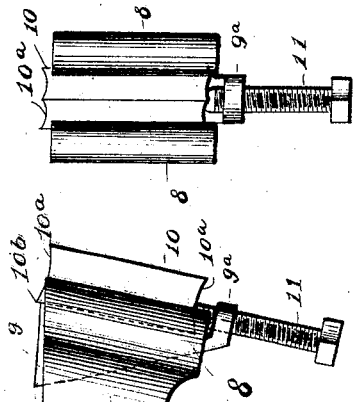
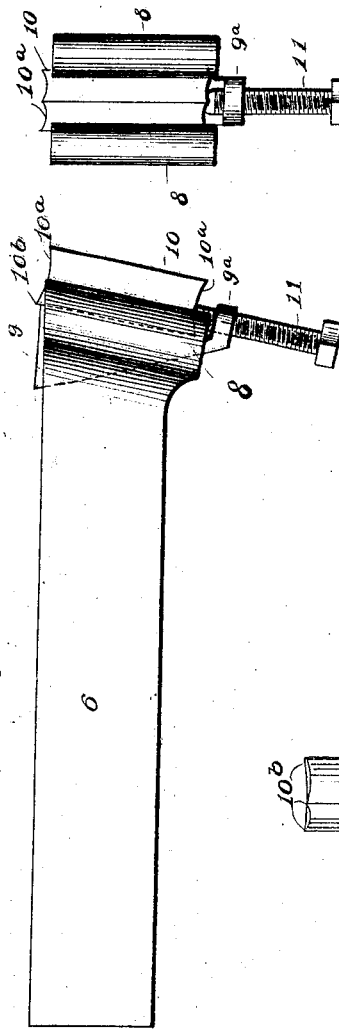
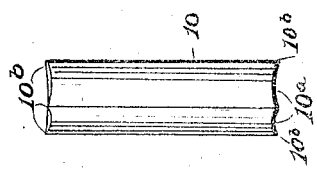
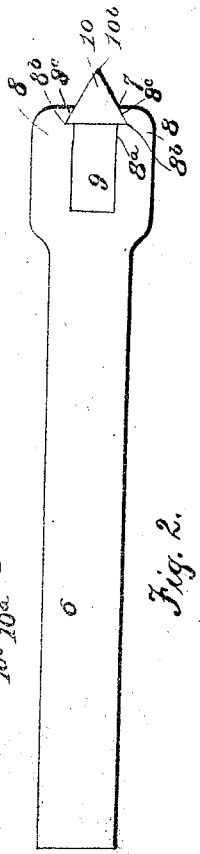
WITNESSES: INVENTORS
Wm. F. Koeller and Henry Dyer
BY
Milo B. Stevens & Co.
ATTORNEYS.

UNITED STATES PATENT OFFICE.

WILLIAM F. KOELLER AND HENRY DYER, OF DETROIT, MICHIGAN.

LATHE-TOOL.

SPECIFICATION forming part of Letters Patent No. 693,974, dated February 25, 1902.

Application filed June 7, 1901. Serial No. 63,547. (No model.)

*To all whom it may concern:*

Be it known that we, WILLIAM F. KOELLER and HENRY DYER, citizens of the United States, residing at Detroit, in the county of Wayne and State of Michigan, have invented certain new and useful Improvements in Lathe-Tools; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to lathe-tools, and particularly to screw-cutting lathe-tools; and its object is to provide a tool the blade of which is provided with a number of cutting edges at each end thereof, together with a holder in which the blade may be securely held for operation of one of the cutting edges without injury to any of the others. Each cutting edge of the blade may be used before the tool is required to be removed to be sharpened, and as the blade we have illustrated as embodying our invention has six cutting edges its utility is apparent.

A further object is to provide a tool the holder of which has a screw against which the end of the blade abuts, said screw being adjustably mounted in a movable wedge-shaped block, so that the blade may be readily adjusted and securely held and easily and quickly removed when desired.

Referring to the drawings, Figure 1 is a side elevation of the tool. Fig. 2 is a top plan view thereof. Fig. 3 is a front or end view thereof. Fig. 4 is a perspective view in detail of the blade.

Referring more particularly to the drawings, the shank of the tool is represented at 6 and is adapted to be inserted in the tool-post of a lathe. The socket is indicated at 7 and is open at both ends or at both top and bottom, extending vertically between jaws 8. The socket consists of a substantially rectangular recess 8ª, adapted to receive a close-fitting wedge-block 9, and within lips 8ᶜ of the jaws acute angular grooves 8ᵇ, adapted to receive the longitudinal edges of the blade 10. The wedge-block 9 is provided at its lower end with a lateral extension 9ª, having an internally-threaded bore for the engagement of a screw 11, against which the lower end of the blade abuts.

The blade 10 is formed of a piece of steel substantially triangular in cross-section, the ends of which are slightly concave, as at 10ª, and formed at each corner into a cutting-point 10ᵇ, adapted for cutting threads in screws, bolts, and the like.

When the wedge-block and blade are fitted in the socket, with the lower end of the blade bearing against the inner end of the screw 11, pressure or thrust on the blade, as in use, causes the wedge to tightly bind the blade in the socket against movement or displacement. The required adjustment of the blade can be secured by relative rotation of the screw 11. The blade is held in the holder in such manner as not to injure any of its cutting-points, and it is evident that when a point becomes dull the blade may be easily and quickly removed and turned to present another point to the work. The life of the blade is thus prolonged and the time of the workman saved.

Having thus described the invention, what is claimed as new, and desired to be secured by Letters Patent, is—

1. In a lathe-tool, in combination, a holder, a socket therein, a blade and a wedge adapted to be held in the socket, said wedge having a lateral projection and means carried by the projection to adjustably support the blade.

2. In a lathe-tool, in combination, a holder, a socket therein, a triangular blade having cutting-corners at both ends, a wedge having a projection, the blade and wedge being held within the socket, and a screw fitted to the projection and adapted to support the blade, the upper end of the screw bearing against the lower end of the blade within its cutting-corners.

3. In a lathe-tool, in combination, a holder, a socket therein, a blade, a sliding block in the socket adapted to adjustably bind the blade as a wedge and a lateral projection on the block adapted to support the blade as an abutment.

4. In a lathe-tool, in combination, a holder, a socket therein, a blade, a wedge having a projection, and a screw fitted to the projection and adapted to support the blade.

5. In a lathe-tool, in combination, a holder, a socket therein, and a blade comprising a metal block having cutting edges at both ends thereof and a wedge having a projection extending under the lower end of the block and a screw fitted to the projection and adapted to bear against the lower end of the block within the cutting edges.

6. In a lathe-tool, in combination, a holder, a socket therein having a longitudinal front opening, blade-retaining lips at the edges of the opening, a triangular blade in the socket one longitudinal edge of which projects through the opening between the lips, and a wedge between the blade and the back of the socket, said wedge having a projection extending under the lower end of the blade, and a screw fitted to the projection and adapted to support the blade.

In testimony whereof we affix our signatures in presence of two witnesses.

WILLIAM F. KOELLER.
HENRY DYER.

Witnesses:
W. A. DEHN,
J. A. GORDON.